W. C. HEDGCOCK.
CLASP BRAKE.
APPLICATION FILED MAR. 13, 1915.
1,146,874.
Patented July 20, 1915.
2 SHEETS—SHEET 2.
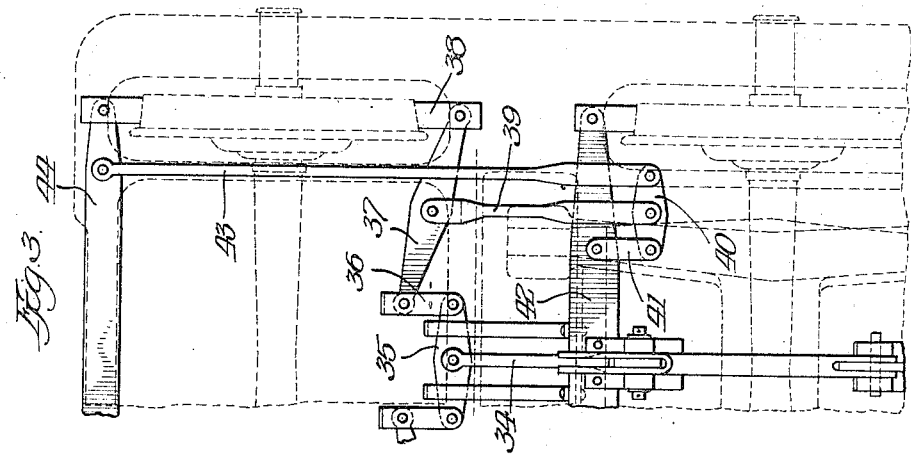
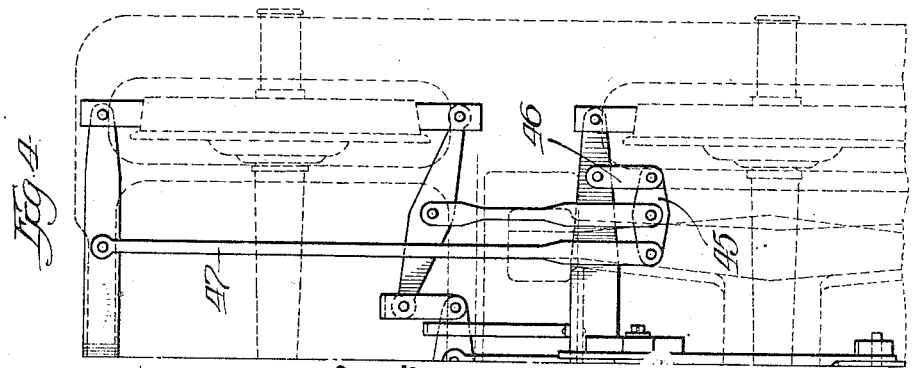
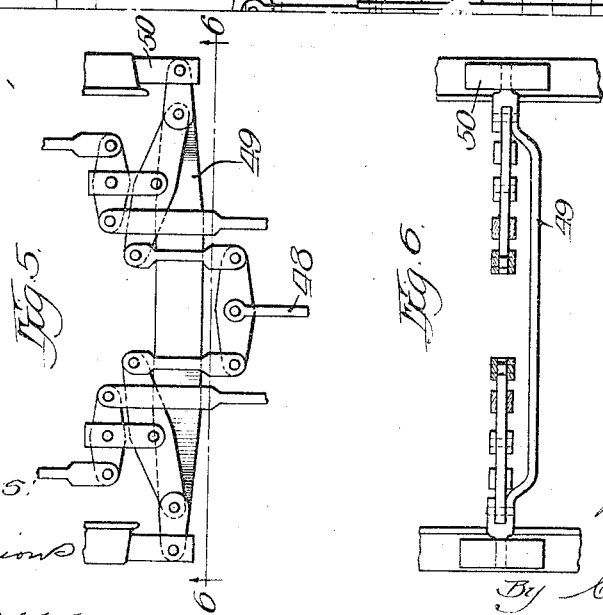

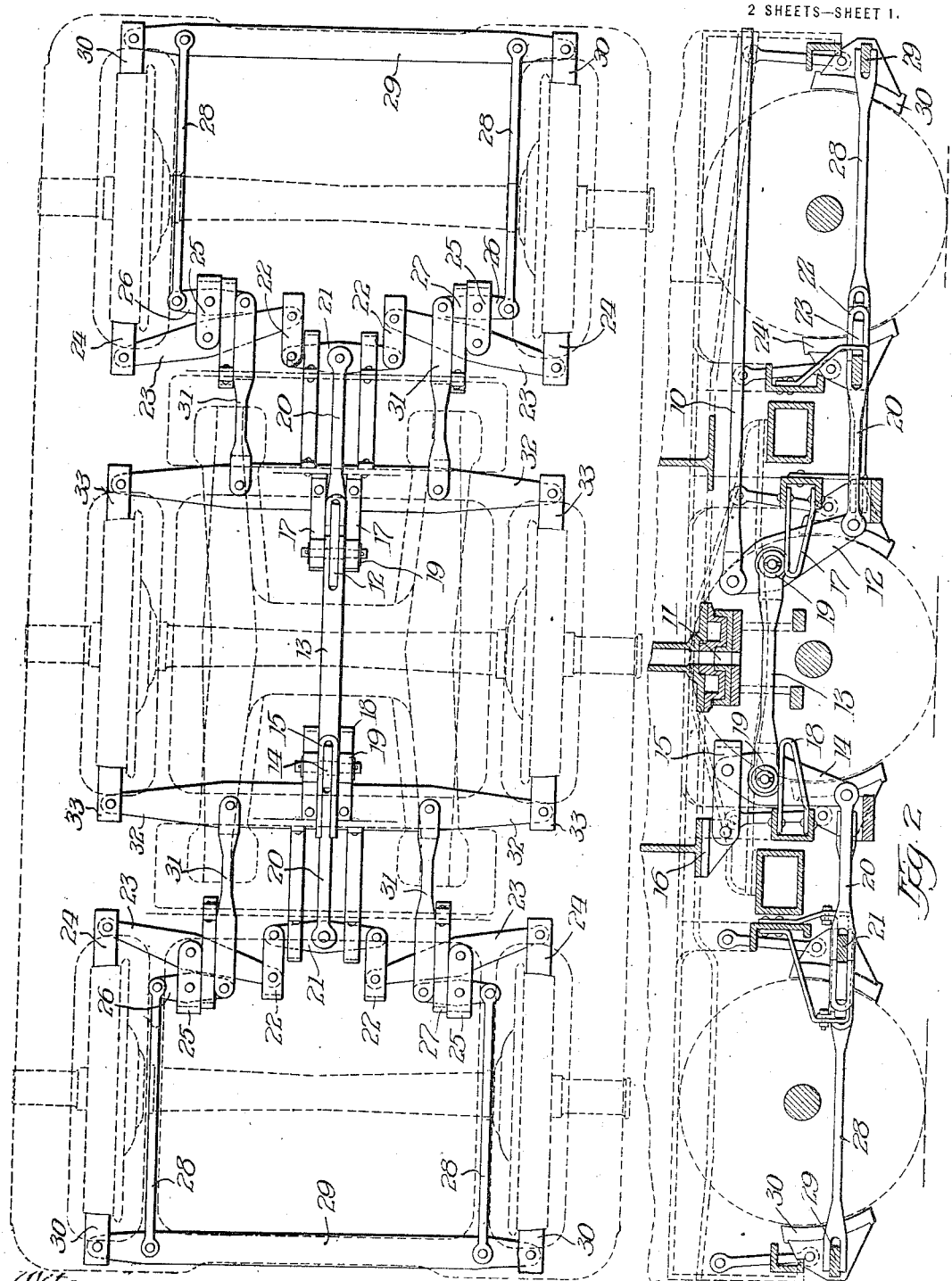

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

CLASP-BRAKE.

1,146,874.

Specification of Letters Patent.   Patented July 20, 1915.

Application filed March 13, 1915.   Serial No. 14,114.

*To all whom it may concern:*

Be it known that I, WILLIAM C. HEDGCOCK, a citizen of the United States, and resident of Chicago, in the county of Cook and State of Illinois, have invented certain new and useful Improvements in Clasp-Brakes, of which the following is a specification.

My invention relates to clasp brakes and has particular reference to a novel clasp brake and the rigging for actuating the same.

A particular object in the construction of brakes and particularly brakes of the type in which the braking force is applied to both sides of each wheel is to eliminate as far as possible the tendency to pull the truck out from under the car body. This is accomplished to a material extent by fulcruming the dead-end of the system of levers on the car body.

Another object is to apply the force from the air cylinder to the truck at a point as near as possible to the pivotal axis of the truck thus obviating the tendency toward irregularity in the braking force, caused by the swiveling action of the truck on curves, which obtains in braking systems where the force is applied to the truck at a relatively greater distance from the pivotal axis.

A further object in the present construction is to eliminate all dead-ends or fulcrum points from the car truck.

The invention will be more readily understood by reference to the accompanying drawings, wherein, Figure 1 is a plan view of a brake rigging constructed in accordance with my invention; Fig. 2 is a longitudinal section through the construction shown in Fig. 1; Fig. 3 is a plan view of a slightly modified form of rigging; Fig. 4 is a further modification; Fig. 5 is a fragmentary view of a still further modification, and, Fig. 6 is a section on the line 6—6 of Fig. 5.

Referring more particularly to the drawings, it will be seen that the air cylinder pull-rod 10, extends to a point near the king-bolt 11, of the truck and is connected to a floating lever 12. A link 13, connects the lever 12, with a similar lever 14, which has a floating connection through a link 15, to a member 16, on the car body. The levers 12, 14, and their associated parts are supported by means of brackets 17, 18, the direct contact being through anti-friction rolls 19, carried by the pins which connect the link 13, with the levers 12, 14. This provides for freedom of longitudinal movement of the link 13, as required. To the lower end of the lever 12, is connected a link 20, which link is connected to an equalizer 21, the ends of the equalizer being connected through links 22, to brake levers 23, which levers carry brake heads 24, at their outer ends. Intermediate the ends of the levers 23, and acting as fulcrums therefor are links 25, to which are connected equalizers 26, these equalizers and the brake levers 23, being supported in and slidable on a bracket 27. To one end of the equalizer 26, is connected a pull rod 28, which rod engages a brake bar 29, near the end thereof, the brake bar carrying brake heads 30, at its ends. To the other end of the equalizer 26, is connected a link 31 which acts under compression upon the brake bar 32, which bar likewise carries brake heads 33, at its ends. The mechanism just described is duplicated on the opposite end of the truck.

In the construction just described it will be seen there is no dead end except that which is found in the bracket 15, which bracket is located near the axis of the truck and is connected to the car body.

In the construction shown in Fig. 3, the rod 34, corresponds to the rod 20, in Figs. 1 and 2. To this rod is connected an equalizer 35, and through a link 36, a connection is made to a brake lever 37, which carries a brake head 38, on its outer end. A compression rod 39, is connected to the middle of the rod 37, and extends horizontally to an equalizer 40. To one end of this equalizer is connected a link 41, having a bearing upon the brake beam or brake bar 42. The other end of the equalizer is connected to a pull rod 43, which extends to the outer brake bar 44.

In the construction shown in Fig. 4, the elements are reversed in position, the numbered parts being the same as shown in Fig. 3. In that figure the equalizer 45, corresponds to the equalizer 40, in Fig. 3, and the link 46, is located on the outer end of the equalizer instead of the inner end as shown in Fig. 3. This results in placing the rod 47, on the inside instead of on the outside.

In the construction shown in Figs. 5 and 6, the rod 48, corresponds to the rod 20, in Fig. 1, and the construction is the same as shown in that figure except in that I provide a brake bar 49, for connecting the heads 50, the braking force being applied to the bar near the ends thereof instead of directly to the brake heads. This results in a construction which obviates spreading or inaccuracy of application of the brake shoes.

Obviously the construction is capable of many modifications other than those shown and such modifications as are within the scope of my claims I consider within the spirit of my invention.

I claim:

1. In a truck mechanism, the combination of an air brake pull-rod terminating near the pivotal axis of the truck, live and dead levers one of which is connected to the pull-rod and the other to the car body, an equalizer to which each of said levers is connected, brake levers extending from each side of each equalizer, an equalizer connected to each brake lever, a pull-rod connected to one end and a push rod connected to the other end of said last named equalizer, substantially as described.

2. In a car brake mechanism, the combination of substantially vertical live and dead levers located near the pivotal axis of the truck, said dead lever having a floating pivotal connection to the car body, an equalizer connected to the lower end of each of said levers, brake levers connected to the ends of each equalizer, and second equalizers connected to each of said brake levers intermediate of the ends of said brake levers, said last named equalizers exerting a pull at one end and a push at the other end, substantially as described.

3. In a railway car brake, the combination of a car body and a truck, an air cylinder pull-rod extending to a point near the axis of said truck, a substantially vertical lever to which said pull-rod is connected, a link connecting said substantially vertical lever to a second substantially vertical lever, said last named lever having a pivotal connection to the car body close to the pivotal axis of the truck, each of said substantially vertical levers being connected to an equalizer, and brake levers connected to the ends of said equalizers, substantially as described.

4. In a railway car brake, the combination of a car body and a truck, an air cylinder pull rod extending to a point near the axis of the truck, a floating lever to which said pull rod is connected, a second floating lever, a link connecting said floating levers, said second lever having a pivot on the car body, an equalizer connected to each of said floating levers, brake levers connected to said equalizer at each end thereof, equalizers connected to said brake levers, and a compression rod connected to said second equalizer and extending to an adjacent brake mechanism.

In witness whereof I have hereunto signed my name in the presence of two subscribing witnesses.

WILLIAM C. HEDGCOCK.

Witnesses:
J. F. LYNN,
CHARLES R. ROE.

Copies of this patent may be obtained for five cents each, by addressing the "Commissioner of Patents, Washington, D. C."